(12) United States Patent  
Kitchen

(10) Patent No.: US 9,290,228 B2  
(45) Date of Patent: Mar. 22, 2016

(54) TRANSFORMABLE BICYCLE-CART SYSTEM

(71) Applicant: Jess Kitchen, Columbia Falls, MT (US)

(72) Inventor: Jess Kitchen, Columbia Falls, MT (US)

(*) Notice: Subject to any disclaimer, the term of this patent is extended or adjusted under 35 U.S.C. 154(b) by 0 days.

(21) Appl. No.: 14/603,167

(22) Filed: Jan. 22, 2015

(65) Prior Publication Data

US 2015/0203166 A1    Jul. 23, 2015

Related U.S. Application Data

(60) Provisional application No. 61/930,057, filed on Jan. 22, 2014.

(51) Int. Cl.

| | | |
|---|---|---|
| *B62K 13/00* | (2006.01) | |
| *B62K 15/00* | (2006.01) | |
| *B62H 1/02* | (2006.01) | |
| *B62J 7/04* | (2006.01) | |
| *B62J 7/06* | (2006.01) | |
| *B62K 7/02* | (2006.01) | |

(52) U.S. Cl.
CPC *B62K 13/00* (2013.01); *B62H 1/02* (2013.01); *B62J 7/04* (2013.01); *B62J 7/06* (2013.01); *B62K 7/02* (2013.01); *B62K 15/008* (2013.01)

(58) Field of Classification Search
CPC ...... B62K 13/00; B62K 15/00; B62K 15/006; B62K 15/008

USPC ............................. 280/278, 287, 415.1
See application file for complete search history.

(56) References Cited

U.S. PATENT DOCUMENTS

| | | | |
|---|---|---|---|
| 4,422,663 A | 12/1983 | Hon | |
| 4,429,891 A | 2/1984 | Hon | |
| 4,433,852 A * | 2/1984 | Hon | 280/278 |
| 4,438,942 A | 3/1984 | Hon | |
| 4,448,435 A | 5/1984 | Hon | |
| 4,462,606 A | 7/1984 | Hon | |
| 6,336,649 B1 * | 1/2002 | Lin | 280/278 |
| 6,688,627 B1 * | 2/2004 | Strange | 280/278 |
| 7,175,192 B1 | 2/2007 | Lu | |
| 8,162,345 B1 * | 4/2012 | Szu-Yao | 280/287 |
| 2008/0224441 A1 * | 9/2008 | Lu | 280/278 |
| 2011/0025016 A1 * | 2/2011 | Waaijer | 280/287 |
| 2014/0327226 A1 * | 11/2014 | Gerencser | 280/278 |
| 2014/0367931 A1 * | 12/2014 | Bell | 280/7.17 |

FOREIGN PATENT DOCUMENTS

| | | |
|---|---|---|
| JP | 2013082378 | 5/2013 |
| WO | WO8701084 | 2/1987 |

* cited by examiner

*Primary Examiner* — John Walters  
*Assistant Examiner* — Brian Swenson  
(74) *Attorney, Agent, or Firm* — Parsons Behle & Latimer

(57) ABSTRACT

A durable, full-sized, transformable bicycle that is capable of being comfortably ridden in outdoor or other rougher riding environments and that is capable of being transformed into a cart or the like capable of carrying heavy or awkward loads when transformed.

11 Claims, 5 Drawing Sheets

TRANSFORMABLE BICYCLE-CART SYSTEM

CROSS-REFERENCE TO RELATED APPLICATIONS

This application claims the benefit of U.S. Provisional Application Ser. No. 61/930,057, filed Jan. 22, 2014, which is hereby incorporated by reference in its entirety.

FIELD OF THE DISCLOSURE

This disclosure relates to bicycles that are transformable into a cart, wheelbarrow, or the like. In particular, the disclosure relates to a transformable bicycle suitable for use in outdoor activities such as hunting, camping, or the like.

BACKGROUND

Transformable bicycles are known, however, they are typically transformable, or foldable, for convenience of transporting or storing, and, thus, are sized to be smaller, or less rugged than typical bicycles. Likewise, some transformable bicycles have customized or specialized frames or other components in order to be compactly folded or otherwise transformed.

The smaller components (e.g., wheels) or specialized frames are typically due to the compromise between compactness when folded and comfort when ridden as a bicycle. Typically, for most transformable bicycles it is more important that the bicycle fold down to a smaller size for ease of transport (e.g., storing in an automobile trunk or carried onto public transportation) than it is for optimal riding comfort or ease. Such transformable bicycles may be suitable for commuting, light shopping (e.g., smaller or a few packages), or the like. However, small-wheeled or custom framed transformable bicycles are not suitable for use in outdoor or other rougher riding environments. Furthermore, existing transformable bicycles are not suitable for carrying heavy or awkward loads when transformed. Other drawbacks and disadvantages of existing transformable bicycles also may exist.

Thus, there exists a need for a durable, full-sized, transformable bicycle that is capable of being comfortably ridden in outdoor or other rougher riding environments and that is capable of being transformed into a cart or the like capable of carrying heavy or awkward loads when transformed. Other needs are also met by the disclosed embodiments.

SUMMARY

Accordingly, disclosed embodiments include a transformable bicycle having a front wheel, a back wheel, a frame having at least one pivot point, at least one brake, a front rack located substantially over the front wheel, a back rack located substantially over the back wheel, and at least one cart handle extension connected to the frame. In some embodiments, pivoting the frame about the at least one pivot point enables the front wheel to be positioned substantially parallel and substantially coaxial with the back wheel.

In some embodiments, the least one of the front rack and the back rack further have a rack lock. In some embodiments, when the frame is pivoted about the at least one pivot point the rack lock connects the front rack to the back rack.

In some embodiments, at least one of the front rack and the back rack further have at least one foldable portion. In further embodiments, the at least one cart handle extension is adjustable. In still further embodiments, the at least one cart handle extension is adjustable in at least one of a rotational aspect and a length.

In some embodiments, the transformable bicycle has at least one handlebar and the at least one brake is mounted on the at least one handlebar. In some embodiments, the at least one handlebar is selectively removable and mountable in the at least one cart handle extension.

Some disclosed embodiments include a bicycle, convertible into a cart, having a front wheel, a rear wheel, a frame having at least one pivot point, further having a socket, wherein the at least one pivot point pivots at least a portion of the frame and positions the front wheel next to and substantially parallel and substantially coaxial with the rear wheel, a right handlebar, a left handlebar, a rack for carrying cargo, at least one brake mounted on either the right or left handlebar, a cart handle extension comprising a socket, and wherein at least one of the right handlebar and the left handlebar are removable and mountable in either the at least one pivot point socket or the cart handle extension socket to form at least one cart handle.

In some embodiments, when the frame is pivoted and the front wheel is positioned next to the rear wheel, the rack is positioned substantially over both the front wheel and the rear wheel, and the at least one cart handle is positioned behind the rack. In some embodiments, the at least one brake mounted on at least one of the left handlebar or the right handlebar is movable along with at least one of the left handlebar or the right handlebar when mounted as at least one cart handle.

In some embodiments, the rack further comprises at least one foldable portion. In further embodiments, at least one of the cart handles is an adjustable handle. In still further embodiments, the adjustable handle is adjustable in length. Other features and advantages of the disclosed embodiments also exist.

Figure 1:
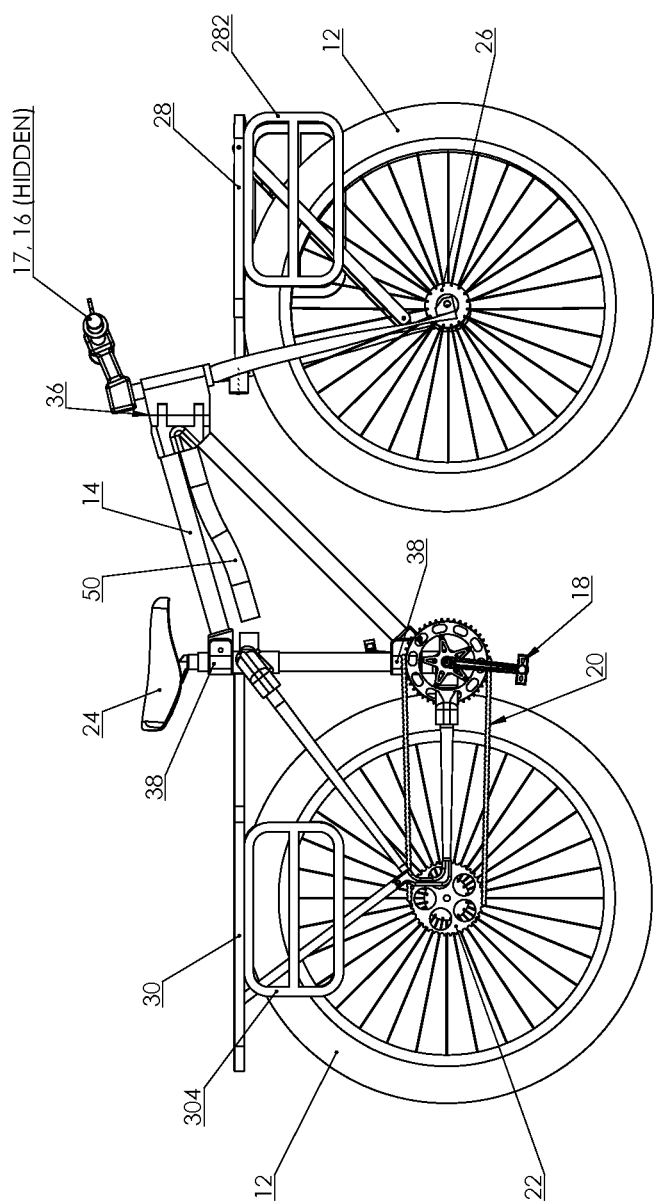
FIG. 1 is a side view of embodiments of the disclosed transformable bicycle in bicycle configuration.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is a side view of embodiments of the disclosed transformable bicycle 10 in bicycle configuration. As shown, embodiments of transformable bicycle 10 may comprise the typical components for a full-sized bicycle suitable for riding outdoors over rough terrain (i.e., a so-called "mountain bike," or the like). As shown, the transformable bicycle 10 may comprise wheels 12, a frame 14, handlebars (left 16, right 17), pedals 18, a chain 20, one or more gears 22, a seat 24, and brakes 26. As also shown, embodiments of the transformable bicycle 10 may also comprise a front rack 28, mounted over the front wheel 12, and a back rack 30, mounted over the back, or rear, wheel 30. Additional features of front rack 28 and back rack 30 are discussed below.

Embodiments of the transformable bicycle 10 also comprise a left cart handle extension 50 and a right cart handle 34. In some embodiments, when in the bicycle configuration, the left handlebar 16 and right handle bar 17 are substantially perpendicular with the frame 14 as shown in FIG. 1 to permit normal riding of the transformable bicycle 10. Additional features enabling the transformation of handlebars (16. 17) into cart handles (32, 34) are as discussed below.

Figure 2:
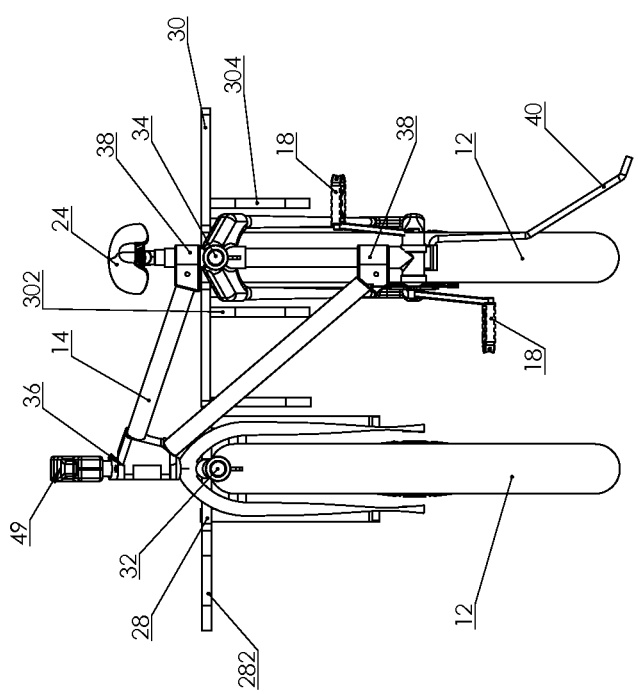
FIG. 2 is a front view of the transformable bicycle in cart configuration in accordance with some disclosed embodiments.

FIG. 2 is a rear view of the transformable bicycle 10 in cart configuration in accordance with some disclosed embodiments. As shown, embodiments of transformable bicycle 10 may comprise a frame 14 with two pivot points (36, 38). First pivot point 36 may be located at or near the front of frame 14 (e.g., under handlebars 16, 17) and second pivot point 38 may be located at or near the rear of the frame 14 (e.g., under seat 24). Location of the pivot points (36, 38) in such a manner enables the front and rear wheels 12 to be positioned substantially parallel, and substantially coaxial, to one another as shown in FIG. 2. As also shown, embodiments of transformable bicycle 10 may also comprise a stand, such as kick stand 40, that enables the transformable bicycle 10 to be stood upright in either bicycle or cart configuration.

For some embodiments first and second pivot points (36, 38) may be held in place by implementation of a suitable locking device. For example, a locking pin (not shown) may be selectively inserted through corresponding holes in frame 14 to selectively secure the pivot points (36, 38) in the desired position. In some embodiments it is preferable that the pivoting and locking can be accomplished without the use of any tools or other implements. Other locking devices are also possible.

As also illustrated in FIG. 2, for some embodiments, when the frame 14 is pivoted from bicycle to cart configuration, handle bars (16, 17) may be removed from the head clamp 49 and inserted into appropriate receptors to form cart handles (32, 34). For example, left handlebar 16 may be inserted into left cart handle extension 50 to form left cart handle 32 and right handlebar 17 may be inserted into an appropriate socket on the second pivot point 38 to form right cart handle 34. In some embodiments, left and right handlebars (16, 17) may be locked into place in the respective receptors through a pin-and-hole arrangement, threading, a compression fit lock, or the like. Preferably, the removal, rearrangement, and locking of the handlebars (16,17) into place as cart handles (32, 34) may be accomplished by hand without the need for other tools. Other embodiments may allow for the pivoting and locking of both left and right cart handles (32, 34) in order to allow for wider or narrower handle positions as desired. In some embodiments it is preferable that the pivoting and locking can be accomplished without the use of any tools or other implements.

Figure 3:
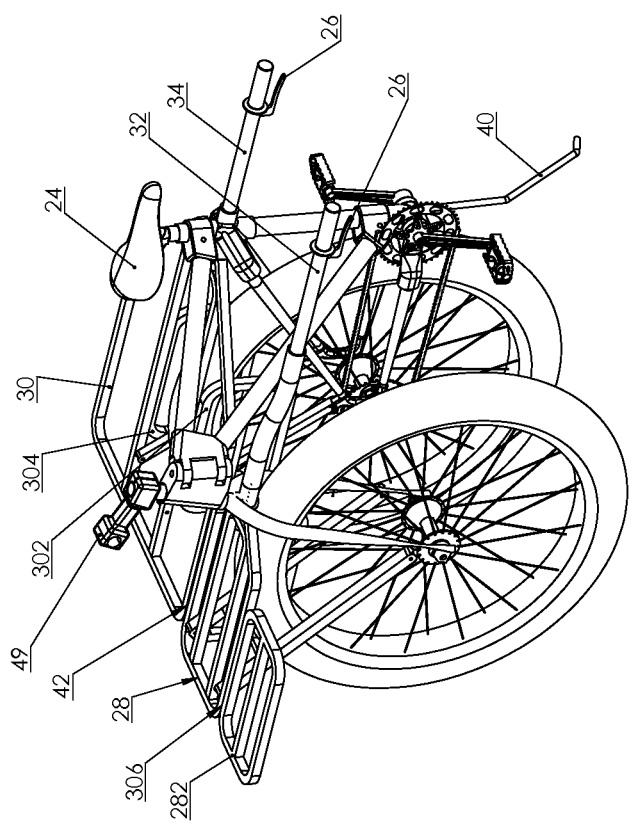
FIG. 3 is a perspective view of a foldable rack in accordance with some disclosed embodiments.

As also illustrated in FIGS. 2 and 3 embodiments of transformable bicycle 10 may comprise foldable front (28) and back (30) racks. Some embodiments may comprise one or more foldable portions for each rack (28, 30). For example, front rack 28 may have a single foldable portion 282 and back rack 30 may have two foldable portions 302, 304. Of course, other configurations for the foldable portions are also possible. As shown, front rack 28 and back rack 30 may comprise a suitable number of hinges 306 to enable the foldable portions (e.g., 282, 302, 304) to fold out to a substantially flat position. As shown in FIG. 3, hinges 306 also enable the racks (e.g., back rack 30) to be folded into a smaller configuration that may be preferable in some circumstances (e.g., when riding in bicycle configuration).

As shown in FIG. 3, front rack 28 and back rack 30 substantially align when in cart configuration and, for some embodiments, may be locked into position by a suitable rack lock 42. In some embodiments, rack lock 42 may comprise a pin and through-hole arrangement, however, other rack locks 42, such as hooks, clasps, or the like, are also possible. In embodiments where front rack 28 and back rack 30 are extended and locked into position, they provide a relatively large and sturdy platform on which relatively heavy or awkward objects can be loaded and carried.

Figure 4:
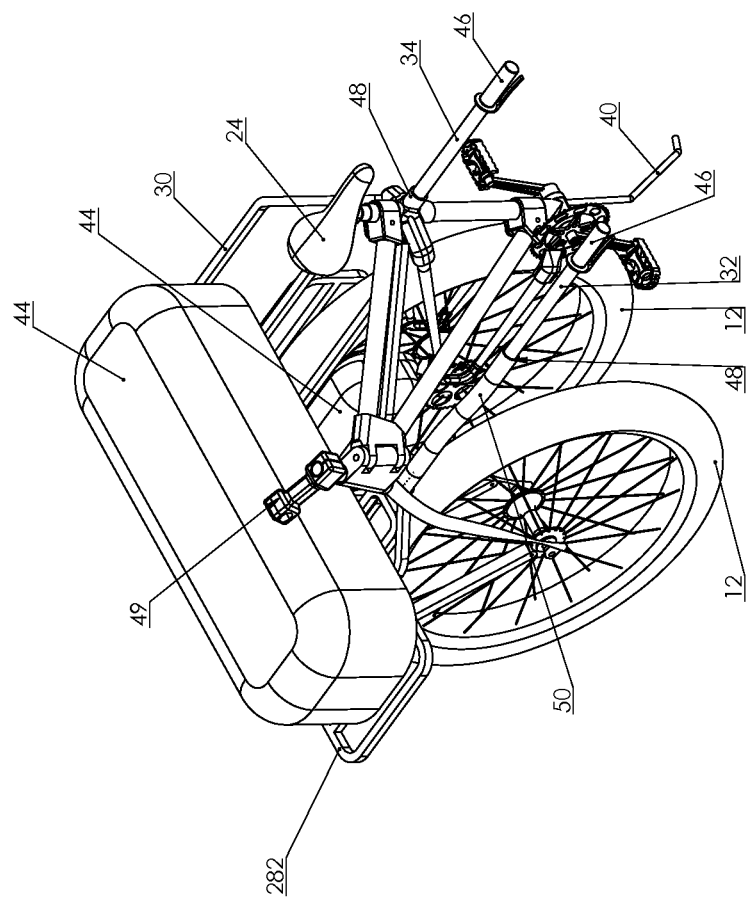
FIG. 4 is a perspective view of the transformable bicycle in cart configuration loaded with cargo.

For example, FIG. 4 is a perspective view of the transformable bicycle 10 in cart configuration loaded with a cargo 44. In the exemplary embodiment shown in FIG. 4, the cargo may comprise a full sized hay bale (e.g., approximately 16"×24"×48").

Figure 5:
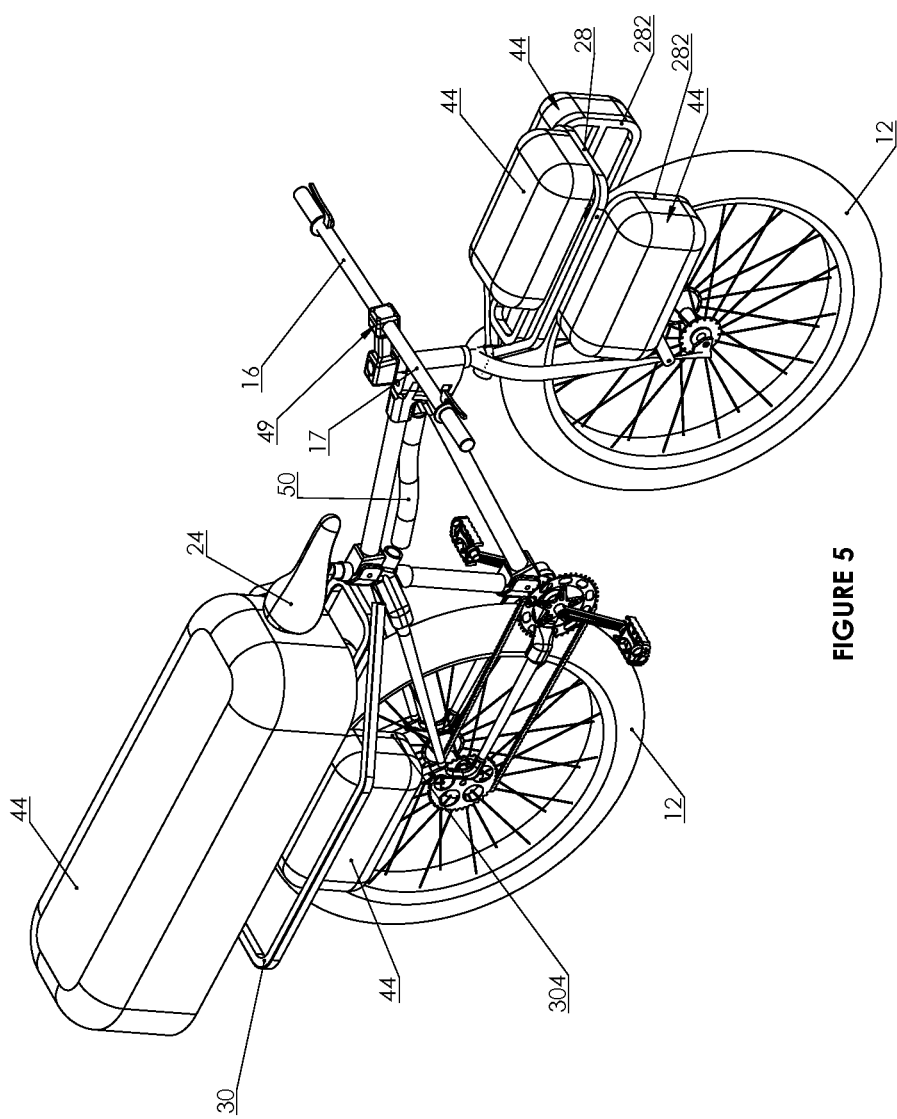
FIG. 5 is a perspective view of the transformable bicycle in bicycle configuration with the front rack unfolded to carry cargo.

Likewise, one or more of the racks (28, 30) may be unfolded while in bicycle configuration as well in order to facilitate the transport of larger cargo 44 while riding. For example, FIG. 5 is a side view of the transformable bicycle 10 in bicycle configuration with front rack 28 unfolded to carry cargo 44 comprising a chain saw and back rack partially unfolded to carry cargo 44 comprising a tool box or fuel canister. In such a manner the transformable bicycle 10 may be ridden in bicycle mode out to a remote forest trail, or the like, while transporting the appropriate tools to cut trees and then converted to cart configuration to transport the cut logs back to a convenient location. Another potential application of the disclosed transformable bicycle is to ride the bicycle in bicycle configuration out to a relatively remote hunting spot. Then, after harvesting a game animal, put the transformable bicycle into cart configuration and use the locked racks (28, 30) to transport the cargo 44 (i.e., the animal carcass) to a convenient location. Of course, other applications are also possible.

FIG. 4 also illustrates other features of some embodiments of transformable bicycle 10. As shown, for some embodiments, it may be desirable that brakes 26 and associated cables (cables and other brake components not shown for clarity) may be relocated along with the handlebars (16, 17) (e.g., for use when in bicycle configuration) to be usable with left cart handle 32 and right cart handle 34 to enable braking of the wheels 12 during cart configuration operations. Other movable brake 26 schemes are also possible.

In addition, for some embodiments left cart handle 32 and right cart handle 34 may be further adjustable for additional user comfort and ease by including grips 46 and a handle adjustment portion 48 that enables the handles 32, 34, to be rotated, extended, or contracted according to user preference. For example, adjustment portion 48 may comprise a pin-and-hole arrangement to allow the positioning of the handles 32, 34, or adjustment portion may comprise threaded portions, hand-adjustable compression fittings, or the like.

Although various embodiments have been shown and described, the present disclosure is not so limited and will be understood to include all such modifications and variations are would be apparent to one skilled in the art.

What is claimed is:
1. A transformable bicycle comprising:
 a front wheel;
 a back wheel;
 a frame comprising at least one pivot point;
 at least one brake;

a front rack located substantially over the front wheel;
a back rack located substantially over the back wheel; and
at least one cart handle extension connected to the frame;
wherein pivoting the frame about the at least one pivot point enables the front wheel to be positioned substantially parallel and substantially coaxial with the back wheel; and
wherein at least one of the front rack and the back rack further comprise:
a rack lock; and
wherein when the frame is pivoted about the at least one pivot point the rack lock connects the front rack to the back rack.

2. The transformable bicycle of claim 1 wherein at least one of the front rack and the back rack further comprise:
at least one foldable portion.

3. The transformable bicycle of claim 1 wherein the at least one cart handle extension is adjustable.

4. The transformable bicycle of claim 3 wherein the at least one cart handle extension is adjustable in at least one of a rotational aspect and a length.

5. The transformable bicycle of claim 1 further comprising:
at least one handlebar; and
wherein the at least one brake is mounted on the at least one handlebar; and
wherein the at least one handlebar is selectively removable and mountable in the at least one cart handle extension.

6. A bicycle, convertible into a cart, comprising:
a front wheel;
a rear wheel;
a frame comprising at least one pivot point, further comprising a socket, wherein the at least one pivot point pivots at least a portion of the frame and positions the front wheel next to and substantially parallel and substantially coaxial with the rear wheel;
a right handlebar;
a left handlebar;
a rack for carrying cargo;
at least one brake mounted on either the right or left handlebar;
a cart handle extension comprising a socket; and
wherein at least one of the right handlebar and the left handlebar are removable and mountable in either the at least one pivot point socket or the cart handle extension socket to form at least one cart handle.

7. The bicycle of claim 6 wherein, when the frame is pivoted and the front wheel is positioned next to the rear wheel, the rack is positioned substantially over both the front wheel and the rear wheel, and the at least one cart handle is positioned behind the rack.

8. The bicycle of claim 6 further comprising at least one brake mounted on at least one of the left handlebar or the right handlebar and that is movable along with at least one of the left handlebar or the right handlebar when mounted as at least one cart handle.

9. The bicycle of claim 6 wherein the rack further comprises at least one foldable portion.

10. The bicycle of claim 6 wherein the at least one of the cart handle further comprises an adjustable handle.

11. The bicycle of claim 10 wherein the adjustable handle is adjustable in length.

* * * * *